Dec. 20, 1960   R. BUMSTEAD ET AL   2,965,720
TAPE RECORDER MONITORING SYSTEM AND START-STOP DEVICE THEREFOR
Filed March 29, 1957

INVENTORS
ROBERT BUMSTEAD &
RALPH W. BUMSTEAD
BY
ATTORNEY

United States Patent Office 2,965,720
Patented Dec. 20, 1960

2,965,720

TAPE RECORDER MONITORING SYSTEM AND START-STOP DEVICE THEREFOR

Robert Bumstead, Philadelphia, Pa. (2 Winsor Drive, Barrington, R.I.), and Ralph W. Bumstead, 2360 Channing Ave., Westfield, N.J.

Filed Mar. 29, 1957, Ser. No. 649,339

15 Claims. (Cl. 179—100.1)

This invention relates to a monitoring system and to a start-stop device for automatically calling the same into service when needed, also to place it in a stand-by condition when not needed. There are many uses for monitoring systems such as herein contemplated. They may be used to expedite the flow of traffic. They are much needed for carrying out certain forms of programming, say, for performing processes of fabrication under automation control. Other processes which have to be carried out under human control, however, may be facilitated, or expedited, if means are provided for giving out verbal instructions from time to time, so as to guide an operator.

The diversified applications of our invention to the useful arts will readily occur to those skilled in such arts if we illustrate one particular application which has to do with the driving of an automobile over an established highway route. The means which we would employ for giving instructions along a given route in advance of reaching any intersection, where the driver has to choose his next turn or to go straight, will not be described in detail. It will be understood that the scope of the invention is by no means restricted to this particular field of usefulness.

An object of our invention is to provide instrumentalities for controlling the times of operation and inoperation of a monitoring system, the times being dependent upon a correlation between a given series of situations which are predictable, and a prepared program which will automatically announce the on-coming of such situations slightly in anticipation of meeting them.

More specifically, an object of our invention is to provide a start-stop control device for a tape recorder, where the moment of starting its operation is made subject to the measurement of certain random sequences of distances along a highway route, and where, after the recorder is allowed to play back a message varying in length according to requirements for announcing a given piece of instructions, and also followed by the play-back of a code signal, as supplied by the recording itself, the tape feed device of this recorder is stopped and held in a stand-by condition until again made responsive to a start signal.

Figure 1:
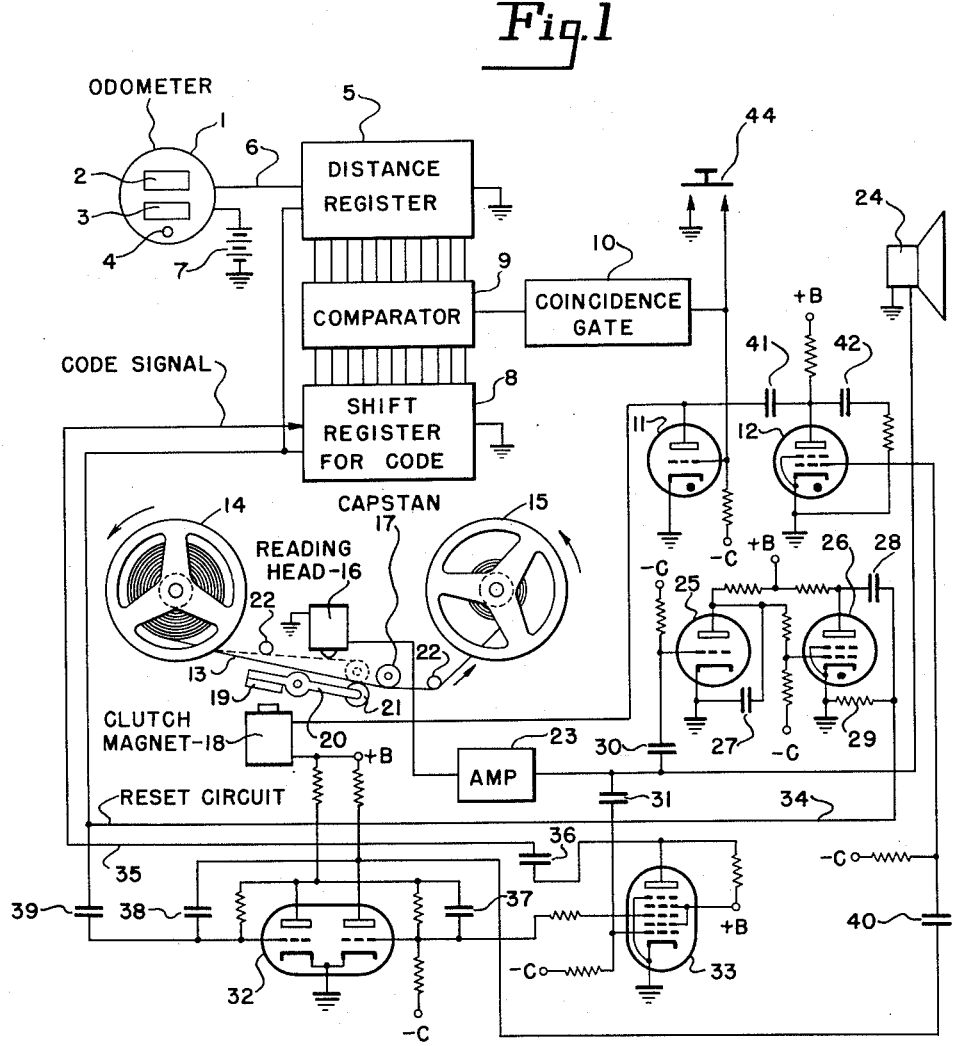
Figure 2:
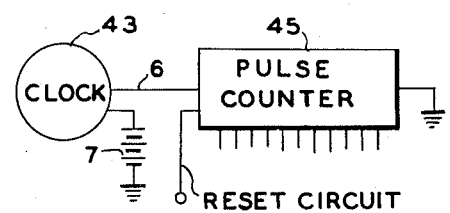

Other objects and advantages, as well as novel features of our invention will be brought out in the following detailed description. This description is accompanied by a drawing in which:

Fig. 1 shows diagrammatically a preferred embodiment of our invention in which the basic components are interconnected by a suitable circuit and the system may be operated in response to an input of electrical pulses generated by an odometer having a circuit-closing-and-opening switch incorporated therein; and Fig. 2 shows a modification wherein the input pulses are periodic, as when produced by a time clock.

Referring to Fig. 1, this embodiment is particularly designed to give instructions to an automobile driver in advance of reaching some point on his route where he must make a decision as to further routing. The odometer 1 is conventionally assembled with a speedometer and serves to measure distances traveled. It may have a total mileage register 2 and a trip register 3, although the latter is non-essential for our purposes. The trip register when provided has a reset knob 4.

The circuit interrupter which we employ as a pulse generator is not shown in our drawing, but is operatively associated with the lowest order dial of the odometer register and preferably yields ten pulses per revolution of that dial (or drum) in order to obtain a count of distance units traveled, say, in tenths of miles. The pulse circuit 6 includes said circuit interrupter and an energy source such as a D.C. battery 7. This circuit constitutes an external control for our monitoring system. The latter is otherwise fully automatic in operation.

A distance register 5 is used to accumulate the total of pulses as generated by a contact device within the odometer 1, where the accumulation is made by means of an electronic counter. Such a counter is well known in the art, one being specifically of the type which accumulates the total in binary code. This type we prefer because it is relatively simple and lends itself readily to the use therewith of a comparator 9, presently to be described. The register equipment 5 may, for example, be composed of eleven binary counting stages, where each stage of the series stands respectively for one of the ascending powers of 2, starting with $2^0$, $2^1$, $2^2$, etc. This 11-stage counter counts up to the equivalent of the decimal number 2047 and repeats. Thus, if its input circuit accumulates pulses corresponding to the tenths of miles registered in the odometer, then, with the register starting at a zero reading, a distance of 204.7 miles may be traveled, and at the next tenth of a mile the register will be re-set to zero.

Binary counters are conventionally operated by feeding a train of pulses into the lowest order stage thereof. Each stage has a flip-flop component which, if of higher order than the lowest order, responds only to "carry" pulses generated by the stage of next lower order. That is, they are subject to shifts from "0" to "1" and from "1" to "0" only half as often as the shifts in the stage of the next lower order. The lowest order stage is usually shiftable alternately from one to the other setting in response to each successive pulse, and therefore counts at the same rate as the applied counting pulses.

The shift register 8 is a memory unit composed of flip-flop stages or other storage media. There are numerous known types. Its function is to store a binary number as read out from a tape recording, prepared in advance for a given highway route to be followed. The number represents a distance in tenths of miles which a driver will be presumed to travel without need of instructions to go this way or that.

An electronic comparator 9 provides means for controlling a coincidence gate 10, so as to generate a start-pulse the end-result of which is to set in motion a play-back device which comprises a tape recorder and associated equipment. In the operation of the comparator 9 conventional circuitry is used to operatively associate the shift register 8 with the distance register 5 and to determine the instant when these two registers reach agreement between the storage of binary numbers therein. This operation is also well known in the art. In our circuit diagram coincidence gate 10 is shown to have an output circuit leading through a resistive connection to the negative terminal of a D.C. source labeled $-C$. The coincidence signal is relatively positive and so it is enabled to trigger a thyratron tube 11 into a conductive state by virtue of a grid connection from that tube to said output circuit.

The winding of a clutch magnet 18 is in series with the space path of the thyratron tube 11, the anode of the thyratron and one terminal of the magnet being interconnected. The other terminal of this magnet is connected to a D.C. source at its +B terminal. The cathode of the thyratron and the minus terminal of this source are both grounded. The clutch magnet 18 is, therefore, maintained energized so long as a closed-circuit condition exists through the space path of the thyratron.

The tape recorder, so-called, needs only to be used as a play-back instrument for carrying out its essential function in the present invention. The tape 13 is supported on a pay-out reel 14 and a take-up reel 15 and is threaded between a constantly driven capstan 17 and an idler roller 21, the latter being carried on an arm 20 which is pivotally mounted and which also carries an armature 19 adjacent one pole of the clutch magnet 18. Two guide members 22 may be used to properly position the tape 13 for play-back service. The reading head 16 has its pole piece so positioned as to sweep the tape recording when the idler roller 21 is brought into such position as to press the tape against the capstan 17. In that position a considerable area of the tape is wrapped about the capstan so as to be drawn at a constant rate past the reading head 16. Conventional friction drive means and pay-out means are provided for permitting the reels to rotate at different speeds dependent upon the number of convolutions of tape carried by each at different times. The constant speed of tape travel is maintained by virtue of a constant rotational speed of the capstan 17.

It is contemplated that a library of tapes will be maintained for servicing subscribers who may want to requisition them for traveling over any intended routes. The scheduling of long routes may involve splicing together different pieces of tape. This preparatory work can, of course, be readily performed by those trained to do it. The tape reel 14 carrying a prepared tape for a specified routing of the vehicle will be mounted on its pay-out spindle; the end of the tape will then be trained over to the empty take-up reel 15 and attached to it in readiness for a run.

The information to be supplied by the tape consists of verbal messages relating to each route intersection where there would be any question of how to negotiate it. A gap of no recording, a relatively short length, will follow the record of verbal signals. After the gap there will be recorded a train of code pulses representing the binary number count of tenths of miles to be travelled while the tape reader is to be held in a stand-by condition. Incidentally, the word "train," as used in the preceding sentence, has a connotation which applies generally to our use of this word throughout this specification and the claims—namely, that the code signals comprised in a single "train" represent, say, individual measurements of distance, or time, or single announcements to be given at different points along a prescribed route of travel. Different signal trains are thus separated, for example, by the gaps between successive recordings on the tape.

It may also be noted that our use of a "gap" in the succession of voice signal trains in combination with sensing means as herein shown and described for switching purposes, or for tape-feed interruption, is only illustrative, since other well-known means for performing such functions may be substituted by those skilled in the art. We come now to a description of components of our system which are to receive and utilize the output signals from the reading head 16.

Throughout the play-back of the signals, both verbal and code, they will be amplified in the amplifier unit 23 and directed through the voice coil of a loud speaker 24. This speaker may be the same as that of the conventional automobile radio, and can be listened to alternatively with radio listening if desired.

The starting of the play-back of a given piece of instructions is timed by a pulse from the coincidence gate 10, as has been mentioned heretofore. For the guidance of a tourist or truck-driver the instructions will be given in advance of reaching any point along the route where a decision must be made. The instruction message may carry at the end thereof a check-point signal like: "Now you should be at the junction previously mentioned—turn right."

The recorded tape track which bears verbal instructions gives out alternating current signals representing audio waves. A coupling capacitor 30 allows these waves to be branched through a circuit in parallel with that of the loud speaker; that is, through a resistor to a —C terminal of a biasing source. This branch circuit is provided as a grid control for a vacuum tube 25. Tube 25 is preferably of triode type and has in parallel with its space path a capacitor 27. We also provide a series of resistive connections between the +B and —C terminals of a D.C. source such that one resistor is placed between the +B terminal and the anode of tube 25, whereas two other resistors are series-connected from the anode of tube 25 to the —C terminal. At the junction between the two resistors last menioned is a grid connection which is used to trigger a thyratron tube 26.

The electrodes of tube 26 are normally supplied with such potentials as will prevent ionization therein. But when the reading head 16 ceases to deliver voice signals, that is, at the silent point of the recorded instructions, tube 25 will become blocked by negative potential on its grid. The consequent rise in its anode potential will cause a charge to be built up on capacitor 27, which does not occur during the presence of the voice signals. The charge becomes sufficient to trigger the thyratron tube 26 into conductivity. Tube 26, however, has its circuit parameters so adjusted that it will be self-restoring to a non-conductive state afer delivering a short pulse through capacitor 28. This pulse traverses a "re-set" circuit and is used to restore the registers 5 and 8 to zero and to trigger a flip-flop tube 32.

Tube 32 is of the twin-triode type the circuit connections for which enable it to operate as a one-shot multivibrator. The —C potential on the grid circuit of the right-hand triode causes this particular triode to normally stand in a non-conductive state, while the left-hand triode is normally conductive. The negative re-set pulse traverses capacitor 39 and the grid resistor connecting the left-hand grid to the anode of that triode, thus causing the triode to become blocked. This reacts upon the grid connections on the right-hand triode, causing conductance therein. This triggered state of the tube 32 persists for a predetermined time interval, as determined by the circuit parameters, and especially by the values of capacitors 37 and 38. The time interval is calculated to allow sufficient time following the occurrence of the re-set pulse for a train of code signals to be played back from the tape 13 and to be registered in the shift register 8. The signal train is composed of mark or space pulses representing the "1" and "0" digits of a binary number. On reading out this number from the tape, it is fed into the shift register 8 through the amplifier 23, capacitor 31, control grid of a gate tube 33, and capacitor 36 to the lowest order stage of the shift register.

The highest order digit of the number to be registered is the first digit to enter the shift register. When the next digit of the number is read, the first digit pushed along into that stage which is of next higher order to the lowest order stage. In this manner the digits of the entire signal train are fed successively into the shift register and are eventually moved into their appropriate stages where they are left standing until the register is again cleared by a re-set pulse.

The reading of the code signal and entry thereof into the shift register 8, as described in the preceding paragraph is enabled by the application of a positive pulse to the third grid of the pentagrid gate tube 33. The positive pulse is derived from the high anode potential on the left triode of the tube 32.

From the foregoing explanation of how the code signal is introduced into the shift register 8, it will be understood that the time interval which includes the read-out of the binary number is suitably calculated to perform this operation before the flip-flop tube 32 restores itself to normal, that is with its left-side triode conductive. On restoration the third grid of the gate tube 33 becomes biased again to such value that no signals further applied to the first grid will have any effect on the anode but will be absorbed in the screen grid circuit. Thus the stored code signal as entered in the shift register will be locked up therein and will not be subject to mutilation.

Now the flip-flop tube 32 performs a further service in that when its right side anode rises in potential (the space path becoming blocked) a triggering pulse is caused to pass through a capacitor 40 and a grid resistor for a thyratron tube 12. Said resistor is connected between the grid and the negative terminal of a biasing source indicated as —C. The function of tube 12 is to operate as an extinguisher for tube 11. When tube 12 is fired by the positive pulse through capacitor 40, its anode potential drops suddenly to a value which is reflected in a substantially equal drop, or at least sufficient drop of anode potential on the anode of tube 11. Tube 11 is then extinguished and the clutch magnet 18 releases its armature 19, so as to remove the idler roller 21 from pressure engagement of the tape against the capstan 17. Thus the tape feed is stopped. Tube 12 has parameters which enable it to be self-extinguishing. The capacitor 42 and resistor connected between the cathode and anode of tube 12 provide this self-extinguishing characteristic.

An initial starting of the tape feed device before any distance has been registered in the electronic register 3 may be accomplished by the use of a manual key 44 which when depressed puts ground potential on the grid of the thyratron tube 11, and thus causes it to be fired and the clutch magnet 18 to be energized.

There are so many obvious ways to stop the tape feed device that none has been specifically shown, but one or more of them may be adopted according to preference. Thus, a key may be provided like key 44 for grounding the grid of tube 12, thereby to fire the same and to cause the extinction of tube 11, as has been described above. This method would not, however, cause the generation of a re-set signal. The distance register 5 and the shift register 8 would retain whatever binary numbers happened to be stored therein; and in certain cases that might be desirable. Another method of stopping the tape feed and clearing the registers would be to provide a key for grounding the grids of the two thyratrons 12 and 26. The operation in this case would be the same as has been described for these tubes, but would not be dependent upon arriving at a gap of tape recording in order to build up a charge on the capacitor 27 by blocking tube 25, as is obvious.

Practical considerations will doubtless dictate the adoption in our system of conventional means for re-winding the tape, and for finding a desired point on the tape for the starting of a program suited to the point of egress of the vehicle from a known geographic starting point. A revolution counter on the capstan 17, and an index of tape reference points will meet these requirements. Therefore, if the full reel of tape should carry monitoring instructions for greater distances of travel along certain routes than would be used in any particular trip by the automobile driver, then he can find his place for starting the operation of the playback device by setting the reels forwardly or backwardly as required, and before applying operating potentials to the tubes other than tube 11. In this way no switching of circuits, as in carrying out the programming of the system above described, will take place before such switching becomes appropriate.

In order to maintain conductance in the tube 25 during pauses between words of the verbal message a constant supersonic wave may be recorded simultaneously with that message. This will avoid premature switching of the signals into the shift register 8.

The comparator 9, as shown in Fig. 1, may be of any well-known type. Its cooperation with other components of our system will be apparent to those skilled in the art. It, therefore, needs no detailed description here. It will be understood, however, that each of the digital components of the comparator has connections to the register 5 and to the shift-register 8 for obtaining digit-by-digit comparisons between the binary numbers that are to be brought into agreement by progressive advancement of the register 5. Upon reaching that agreement the coincidence gate 10 is enabled to deliver the wanted start signal to the grid of the thyratron tube 11. Comparator techniques and their mode of operation may, perhaps, be clarified for those less familiar with the same, by reference to Woolard Patent 2,641,696, dated June 9, 1953. This is a typical example, but others could be cited.

It will be apparent to those skilled in the art that our invention may find utility in connection with monitoring systems other than as described above. For example, the criterion for determining the duration of a waiting period between the issuance of successive pieces of instructions may be based on the anticipation of such waiting periods in terms of elapsed time rather than as measures of distance. This modification of our invention will now be explained with reference to Fig. 2.

We provide a time clock 43 which is equipped with a pulse generator (not shown) for delivering periodic pulses at any suitable rate to indicate elapsed time measurements. The time intervals will then be counted by the pulse counter 45, which takes the place of the distance register 5. Anticipated waiting periods will then be recorded on the tape by codification in the same units of elapsed time as seen by the pulse counter 45. Coincidence between the numerical values of the counted time units in registers 5 and 8 will, accordingly, produce the needed start signal, in the same manner as described for distance comparisons.

According to another aspect of utilization of our invention a signaling channel may be provided for remote supervisory control of the starting times for each issuance of an item of instructions. In this case the counting register 5, as well as the shift register 8, the comparator 9 and the coincidence gate 10 would not need to be called into service, but any suitable signaling channel from the remote point of supervision to the switch 44 would enable the supervisor to give out his prepared instructions simply by means of transmission of a momentary start signal, thus putting no limit on the location of the switch 44. The advantage to be gained by this mode of operation of our invention is obviously to minimize the times of "holding the line" during which the needed instructions might otherwise have to be spoken at possibly considerable length. The feature of automatic shutdown of the play-back device when reaching the end of a piece of instructions is still retained when using this modification.

In cases where the play-back device might be prematurely started from a remote point, as described in the preceding paragraph, and no one happens to be present to listen, the instructions are not lost, but can be repeated when the absent listener returns, simply by re-winding the tape to the starting point and pushing the button 44 for making a repeat play-back. This presumes that the control circuit for grounding the grid of the thyratron tube 11 may be equipped with at least two push-buttons 44, one remotely situated and the other locally placed.

Other modifications of our invention will naturally suggest themselves to those skilled in the art, but may not necessarily depart from the spirit and scope of the invention itself. For example the circuitry employed may substitute transistors for vacuum tubes and thus eliminate tube warm-up time for starting the play-back device, as well as effect a saving on power consumption.

We claim:

1. In mechanism of the class described, a motor-driven device for intermittent feeding of tape through a play-back gate, a record tape which bears a discrete succession of signal trains of one characteristic, such as voice signals, for example, intermeshed with discrete trains of code signals having tape feed control significance, receiving means including said play-back gate for utilization of the signal trains of said one characteristic, a storage register receptive of said code signal trains when transmitted thereto from said play-back gate, said register being arranged and adapted to store at any one time one of said discrete trains which has tape feed control significance, means automatically operable upon ending the play-back of a discrete code signal train for causing said device to arrest its tape feed operation, a resettable pulse counting register receptive of a train of pulses of measurement-determining significance, a comparator operable to compare the progressive count of said pulses with the numerical value of a code signal train then stored in said storage register, and a co-incidence detector operable by said comparator whenever said count reaches equality with the stored code signal value, for causing resumption of the tape feed operation.

2. The combination according to claim 1 and including a distance measuring device arranged and adapted to transmit said train of pulses of measurement determining significance.

3. The combination according to claim 2 wherein said distance measuring device is constituted as an odometer carried by a vehicle on which the other elements of said combination are also mounted.

4. The combination according to claim 1 and including a time-clock having associated therewith a constant frequency pulse generator for transmitting said train of pulses of measurement-determining significance.

5. The combination according to claim 4 and including means operatively associated therewith for obtaining elapsed time measurements.

6. A monitoring system of the class described comprising a single record tape having thereon a series of vocal records and records of code signals which have numerical significance, a playback gate, means for feeding said tape through said gate, equipment for picking up, amplifying and utilizing said records, said equipment comprising a sound reproducer for the vocal records and a memory storage device for the code signals, a resettable pulse-counting regsiter receptive of electrical pulses from a given source, a comparator and co-incidence detector combination operable to yield a control pulse whenever the registered count of pulses from said source reaches equality with the numerical value of a code signal currently stored in said memory device, and start-stop means operable in response to the occurrence of an appreciable pause in the pick-up of said records while feeding said tape for interrupting the tape feed, said start-stop means being further operable in response to the occurrence of said control pulse for causing a resumption of the tape feed.

7. In a system of the class described, a sound-and-code-signal record tape, a pickup gate, means for obtaining an intermittent flow of said tape through said gate, said means being responsive to the occurrence of an appreciable pause in the pick-up of sound signals for causing a delayed arrest of tape flow, the delay being sufficient for obtaining a code-signal pick-up, means for amplifying and reproducing the picked-up sound signals, a digital memory for storing the picked-up code signals, an external source for delivering input signals to said system, means for deriving digital code signals from said input signals, means for comparing the memory-stored code signals with those derived from said external source, a coincidence device operable by the comparison means, and means controlled by the operation of said coincidence device for causing said tape flow means to resume tape feed through said gate.

8. The combination according to claim 7 wherein said external signal source is constituted as a pulse generator carried aboard a vehicle and operatively coupled to an odometer which measures units of distance traveled by said vehicle, and means are provided for maintaining a constant ratio between the count of unit distances traveled by said vehicle from a given starting point and the count of pulses concurrently generated.

9. The combination according to claim 7 wherein said external signal source is constituted as means for delivering periodic pulses, each pulse being representative of a predetermined time interval.

10. In a record playback system, a record medium operatively combined with playback means including a pick-up gate and information-giving responsive means, a vehicle on which said system is mounted, an odometer operatively connected to the running gear of said vehicle, a motor-driven device arranged and adapted to feed said record medium intermittently through said gate, recorded code signal trains interlaced with information-giving signal trains on said record medium, said code signal trains being definitive of certain distances intended to be traveled by said vehicle during predetermined interruptions of record medium feed through said gate, means automatically operable upon ending the playback of a particular code signal train for causing the arrest of record medium feed through said gate, a re-settable pulse counting register receptive of electric pulses initiated by and in accordance with the operation of said odometer, a storage register receptive of code signal trains as successively picked up by said gate, and so arranged that each train as stored erases and supplants a train previously stored, a comparator operable to compare the progressive count of said pulses with the numerical value of a code signal then stored in said storage register, a coincidence detector operable by said comparator whenever said pulse count agrees with said numerical value, and means operable by said detector upon reaching such agreement for causing resumption of record medium feed through said gate.

11. In a monitoring system, a signal train memory for storing a numerical value, a record playback device, a motor-driven record medium operatively combined with playback means including a pick-up gate and information-giving responsive means, said record medium having a track of recordings thereon wherein portions thereof possess varied characteristics capable of causing recurrent start control operation a pulse counter receptive of measurement-designating signal pulses, a comparator and coincidence detector cooperative with said pulse counter and said memory for initiating said start control operation for driving said medium past said pickup gate upon reaching said agreement between the values registered in said memory and said pulse counter respectively, and means responsive to another characteristic of said record medium when sensed, for causing stop control thereof.

12. A monitoring system of the class described comprising a record tape having thereon a plurality of trains of announcing records and trains of code signals of numerical significance, tape-feeding playback means, including pick-up, amplifying and utilization devices for manifesting said records and code signals, a memory device operative to store each said train of code signals as successively picked up, while erasing a previously stored train of such code signals, a re-settable pulse-counting register receptive of electrical pulses from a given source, a comparator and coincidence detector combination operable to yield a control pulse whenever the registered count of said pulses from said source reaches equality with the numerical count of a signal currently stored in said memory, and start-stop means operable in response to the occurrence of an appreciable pause in the playback of said announcing records while feeding said tape, for interrupting that feed, said start-stop means being further operable in response to the operation of said coincidence detector for causing resumption of that feed.

13. A monitoring system comprising a record tape which bears a plurality of trains of recorded announcements and a plurality of trains of recorded code signals of varied measuring significance, motivated tape transport mechanism for feeding said tape and for playback of the recordings thereon, means automatically operable upon ending the playback of certain of said trains for interrupting the operation of said tape transport mechanism, utilization devices responsive to playback operation, one of said devices being a memory device receptive of said code signal trains and operable to store each of the same in replacement of a previously stored train, an external source of pulses of measuring significance, a re-settable pulse-counting register receptive of said pulses, a comparator operable to compare the progressive count of pulses accumulated in said register with the numerical value of a code signal then stored in said memory device, a coincidence detector operable by said comparator whenever said pulse count reaches agreement with that of the memory-stored value, and means operable by said detector, upon reaching such agreement, for causing resumption of operation of said tape transport mechanism.

14. In combination, a vehicle-carried tape transport having start-stop means for feeding a pre-recorded tape through its playback gate, the pre-recordings including announcements intended for playback at pre-selected points of travel of the carrier vehicle, also code signals which when played back are available for memory-storage, a memory arranged to accept such storage, a pulse-signal source, a counter receptive of pulses from said source during periods of idleness of the tape transport, the count of said pulses being commensurate with distances traveled by said vehicle during such idleness periods, a comparator and coincidence detector cooperative with said counter and said memory to cause resumption of tape feed by said start-stop means when the next of said preselected points of travel is reached by said vehicle, and means responsive to the sensing of a significant characteristic of said tape at said playback gate for causing arrest of said tape feed by said start-stop means.

15. In combination, a tape transport having start-stop means for feeding a pre-recorded tape through its playback gate, the pre-recordings including announcements intended for playback at preselected times or places, also code-signals of programming significance which when played back are available for memory-storage, an electronic memory for acceptance of such storage, a pulse-signal source effective to consummate a predetermined programming of operation of said start-stop means, a counter receptive of pulses from said source during periods of idleness of said tape transport, the count of said pulses being definitive of a measured time or space interval to be spanned during such idleness periods, up to the point of arrival of said tape transport at a pre-selected point in time or space where re-starting of playback operation is programmed by said pre-recordings of code signals, a comparator and coincidence detector cooperative with said counter and said memory to cause resumption of tape feed by said start-stop means when the next of said pre-selected arrival points is reached, and means responsive to the sensing of a significant characteristic of said tape at said playback gate for causing arrest of said tape feed by said start-stop means.

References Cited in the file of this patent

UNITED STATES PATENTS

| | | |
|---|---|---|
| 2,501,048 | Haller | Mar. 21, 1950 |
| 2,660,372 | Le Clerc | Nov. 24, 1953 |
| 2,669,457 | Culbertson | Feb. 16, 1954 |
| 2,721,990 | McNaney | Oct. 25, 1955 |
| 2,768,244 | Tiger | Oct. 23, 1956 |
| 2,788,209 | Mantijo | Apr. 4, 1957 |
| 2,837,606 | Barthe | June 3, 1958 |